No. 894,291. PATENTED JULY 28, 1908.
E. C. SHAW.
VEHICLE WHEEL RIM.
APPLICATION FILED FEB. 20, 1907.
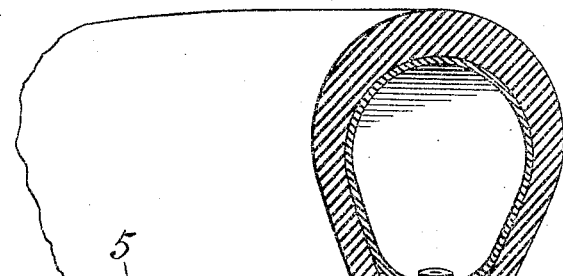
FIG.1.
FIG.2. FIG.3.
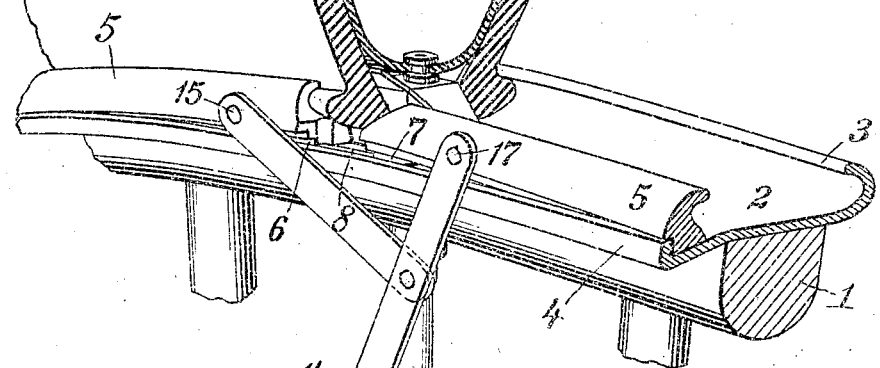
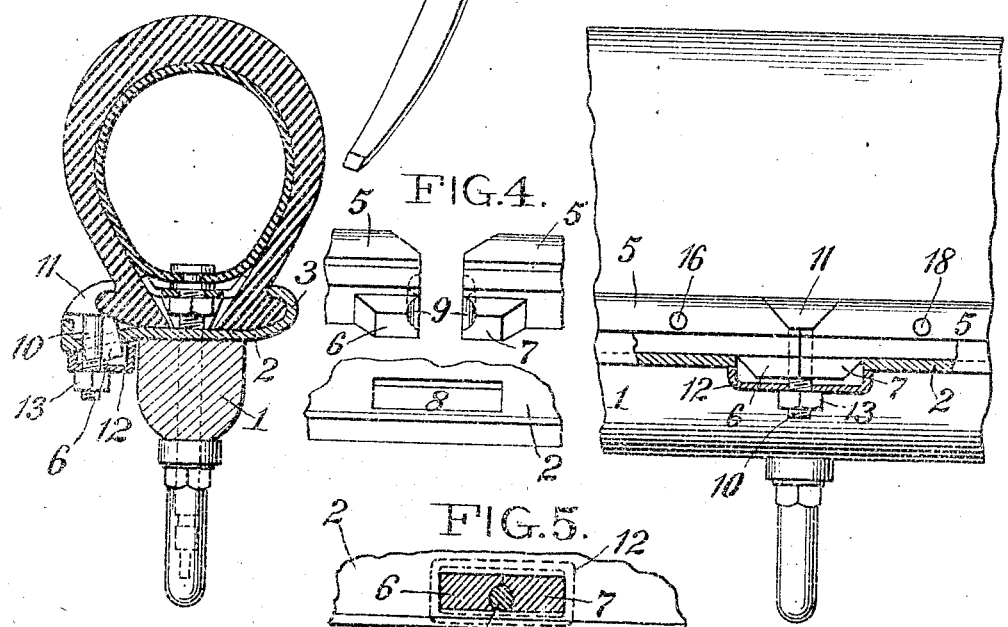
FIG.4.
FIG.5.
FIG.6.
WITNESSES:
Walter F. Thompson
Oliver Williams
INVENTOR
Edwin Copland Shaw
BY
Edward Davis
ATTORNEY

UNITED STATES PATENT OFFICE.

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 894,291.     Specification of Letters Patent.     Patented July 28, 1908.

Application filed February 20, 1907. Serial No. 358,460.

*To all whom it may concern:*

Be it known that I, EDWIN COUPLAND SHAW, a citizen of the United States, residing in the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims designed for use with tires of resilient materials, and more particularly with tires adapted to be attached and removed at will.

I have described and claimed in a companion application an improved vehicle wheel rim having one tire flange permanently mounted upon the channel-iron, an opposing tire flange mounted upon a removable split ring and means for securing locking engagement between the channel-iron and the removable ring.

The object of the invention described and claimed in the present application is to provide a useful modification of the means for securing locking engagement between the channel-iron and the flange-bearing removable ring. I accomplish this object by means of two lugs extending downwardly from the terminals of the split ring, a slot in the channel-iron adapted to receive said lugs and a wedge-headed bolt adapted to secure the said lugs within the said slot and to a strut or bridge seated against the channel-iron beneath said slot.

In the drawings Figure 1 is a perspective view showing a section of the tire and my improved means for attaching the tire to the wheel. Fig. 2 is a cross-section of the tire and rim showing the means for locking the flange-bearing ring to the channel-iron. Fig. 3 is a side view of the tire and rim showing details of construction. Fig. 4 is a perspective view of the terminals of the detachable ring, the lugs thereon and the slot in the rim adapted to receive said lugs. Fig. 5 is a plan view of a portion of the channel-iron showing the location of the slot, and a cross-section of the lugs and bolt when in position. Fig. 6 is a perspective view of the locking means showing an alternative construction.

The flange-bearing removable ring may be constructed in two or more sections by providing similar locking means at the several joints, and with large and heavy structures this may be found advisable. Again, both tire flanges may be made detachable by simply duplicating the split ring and the attaching means, though in practice this is usually found unnecessary and undesirable.

I have shown my device as applied to a tire and rim of the clencher type, in which the flanges are curved upwardly and inwardly to grasp and hold beads formed upon the tire-casing, but it will be obvious to those skilled in the art that by altering the shape of the tire flanges my device can be adapted for use with tires of any form.

Referring to the drawings, in Fig. 1, 1 is a wheel felly, the channel-iron 2 being adapted to be affixed thereto. Formed upon or permanently fixed to this channel-iron is the flange 3, designed to engage one edge of the tire. At its other edge the channel-iron is extended laterally, and the portion beyond the wheel felly preferably has a slight downward tendency toward the hub of the wheel. This edge terminates in an upturned retaining flange 4 extending the entire length of the rim, forming a seat for a removable ring 5, and securing it against laterally outward displacement. The form of this portion of the rim may of course be varied considerably; for example, the inclined portion may be replaced by a downwardly disposed offset. The essential feature is that the upper edge of the retaining flange must be on a line with or below the main portion of the channel-iron so that a tire may be slipped into place without stretching. The form of the retaining flange is likewise immaterial, except that the flange or its equivalent must provide a seat for the removable ring and secure it from laterally outward movement.

The ring 5 is continuous with the exception of a single joint or split which allows it to be attached or removed at will. It comprises a base portion and a tire-retaining flange, the base portion being flattened and beveled so that when it rests upon the extension of the rim and seats against the flange 4 the tire flange is in position to engage the edge of the tire. At the joint of the split ring upon the under-side of its terminals are two lugs 6 and 7 preferably having their posterior ends beveled. The conformation of these ring terminals is more clearly shown in Fig. 4. In the portion of the channel-iron which carries the removable ring and at any convenient point upon its periphery is cut a rectangular slot 8 of suitable size to admit the two lugs when their anterior faces contact in longitudinal alinement. Through the contacting surfaces of the ring terminals and of the lugs is drilled a hole 9, the upper extremity of which is notched or countersunk. A bolt 10 is provided, having a shaft of suitable size to enter the hole 9 and a head 11 shaped to engage in the countersink or notch at the ring terminals and to form a part of the tire flange at that point. The lower extremity of the hole 9 registers with a hole drilled in a bridge or strut 12 and the bolt 10 is threaded to engage with a nut 13 which is adapted to seat against this strut and to secure the bolt in position. The strut may be made of any suitable form, but must seat against the under-surface of the channel-iron and furnish a bearing surface for the nut at a sufficient distance beneath the channel-iron to clear the lugs. If desired, this bridge or strut may consist of an offset integral with the channel-iron itself, but for convenience of manufacture I prefer to construct it as a separate piece, substantially as shown in cross-section in Fig. 2 and in longitudinal section in Fig. 3.

With some forms of ring the continuous slot may weaken the channel-iron too greatly, and to obviate this difficulty I have provided the modification shown in Fig. 6. The head 11 is made considerably longer than in the first form so that the lugs 6 and 7 on the ring terminals are at some distance from one another. In place of this continuous slot, I provide two slots properly located to receive the lugs. The strut is thus rendered unnecessary, the nut 13 seating directly against the channel-iron.

The mode of operation of my device is as follows: To attach a tire the split ring is removed and the tire applied to the rim, engaging closely with the permanent tire flange about the entire periphery of the wheel. The split ring is then sprung about the channel-iron inside the retaining flange and the ring terminals drawn together, forcing the lugs to enter the slot. The bolt 10 is then inserted in the holes in the ring terminals and strut and the nut engaged with the threaded portion of the bolt and turned up against the strut. In this position the tire and the removable flange are securely locked to the rim. The retaining flange 4 prevents laterally outward displacement of the ring; the bolt 10 and the wedge forming its head retain the lugs within the slot and hold the ring terminals against the channel-iron. The engagement of the lugs in the slot moreover prevents any "creeping" or movement of the ring about the periphery of the channel-iron. The tire may be removed by reversing this process.

The operation of the modification shown in Fig. 6 is substantially the same, except that the strut is omitted and the nut seated directly against the channel-iron.

The split ring is proportioned to fit accurately about the channel-iron and it may therefore be found difficult to force its terminals into contact and to force the lugs into engagement with the slot. To accomplish this purpose I provide a jointed lever 14, shown in Fig. 1. A pin 15 is inserted in a hole 16 drilled in the split ring near one of its terminals, a pin 17 is inserted in a corresponding hole 18 in the other terminal, and by means of the lever the two terminals may be made to contact and the lugs forced into the slot ready to be secured in position by the bolt. In order to insert the lugs within the slot the split ring must be accurately adjusted relatively to the position of the slot and to facilitate this and to secure a more firm seat for the split ring upon the channel-iron, I prefer to provide the part of the channel-iron which forms the seat for the split ring with two or more dowels registering with corresponding indentations or depressions in the base of the split ring. Small round-headed rivets driven through the channel-iron will serve the purpose of these dowels.

Having described my invention what I claim is:

1. In a vehicle wheel rim the combination of a channel-iron having a permanent tire flange mounted thereon, a transversely split ring carrying a second tire flange, downwardly extending lugs upon the terminals of said ring, a slot in said channel-iron adapted to receive said lugs and means for securing said lugs within said slot, consisting of a bolt having a flaring head shaped to enter a recess in the split ring and a shaft adapted to pass through and to be secured beneath the channel-iron.

2. In a vehicle wheel rim the combination of a channel-iron having one tire flange permanently attached thereto, a second tire flange mounted upon a removable transversely split ring, a retaining flange upon said channel-iron, downwardly extending lugs upon the terminals of said split ring, a slot in said channel-iron adapted to receive said lugs, a flaring-headed bolt adapted to pass downwardly through the terminals of said split ring and means for securing said bolt beneath the channel-iron.

3. Means for securing a removable tire flange to the channel-iron of a vehicle wheel rim comprising downwardly extending lugs upon said removable flange, a slot in said channel-iron adapted to receive said lugs and a flaring-headed bolt adapted to secure said lugs within said slot and to a strut seating against the channel-iron beneath the slot.

4. In a vehicle wheel rim the combination of a channel-iron carrying one tire flange, a removable split ring carrying a second tire flange, downwardly extending lugs upon the terminals of said ring, a slot in said rim, and means for locking said lugs in said slot, comprising a flaring-headed bolt adapted to pass through the ring terminals and the lugs and to be secured to a strut beneath the slot.

5. In a vehicle wheel rim the combination of a channel-iron carrying one tire flange, a transversely split ring carrying the opposing tire flange, downwardly extending lugs upon the terminals of said ring, a slot in said channel-iron adapted to receive said lugs, and means for securing the lugs within the slot, comprising a bolt having a flaring head forming a part of the split ring and a shaft adapted to enter a hole extending through the contacting faces of the ring terminals and lugs and through a strut beneath the slot, said bolt being threaded and provided with a nut adapted to seat against said strut.

6. Means for securing a removable transversely split tire flange to the channel-iron of a vehicle wheel rim comprising lugs extending downwardly from the terminals of said flange, a slot in the rim adapted to receive said lugs, a bridge or strut seated against the rim below the slot, and a flaring-headed bolt adapted to pass through the contacting surfaces of the flange terminals and lugs and through the said strut and adapted to be secured to said strut by a nut seating against its under-surface.

7. A two-part channel-iron for use with a vehicle wheel, one member seated upon the wheel felly and having its edges formed into flanges, one flange formed to retain the tire and the other forming a seat for the second member, said second member comprising a split ring carrying the opposing tire flange, its terminals being provided with a pair of lugs adapted to fit within a slot in the first member and to be secured therein by a flaring-headed bolt passing through the ring terminals and the lugs and engaging with a strut or bridge contacting with the first member beneath the slot.

8. The combination in a vehicle wheel rim of a channel-iron having at one edge a flange for engagement with a tire and at its opposite edge a downwardly inclined portion terminating in an upwardly projecting retaining flange adapted to form a seat for a removable split ring comprising a base fitted to said seat and a flange for engagement with the tire, lugs upon said ring adapted for engagement within a slot in the channel-iron and a flaring-headed bolt adapted to lock said lugs and the terminals of the said ring to a bridge or strut contacting with the channel-iron beneath the slot.

9. Means for locking a removable transversely split tire flange to the channel-iron of a vehicle wheel comprising lugs extending downwardly from the terminals of said flange, slots in said channel-iron adapted to receive said lugs, and a bolt having a flaring head forming a part of the tire flange and a shaft adapted to pass through a perforation in the channel-iron and to be secured by a nut seating beneath said channel-iron.

10. Means for locking the segments of a removable tire flange to the channel-iron of a vehicle wheel rim, comprising a downwardly extending lug upon each terminal of said segments, a slot in the channel-iron adapted to receive each lug, and a bolt having a flaring head shaped to form a part of the segments at a joint, and a shaft adapted to pass downward through the channel-iron and to be secured thereto by a nut.

11. In a vehicle wheel rim the combination of a channel-iron 2, a tire flange 3 permanently mounted thereon, an opposing tire flange formed upon a transversely split ring 5, lugs 6 and 7 extending downwardly from the terminals of said ring, the contacting surfaces of said terminals and lugs being recessed to form a hole 9, a slot 8 adapted to receive said lugs, a bolt 10 adapted to pass through the hole 9 and provided with a flaring head 11, and a nut 13 adapted to fit upon said bolt and to seat against a strut 12, substantially as described.

EDWIN COUPLAND SHAW.

Witnesses:
C. C. GOODRICH,
W. K. MEANS.